United States Patent [19]

Turansky et al.

[11] 4,428,188

[45] Jan. 31, 1984

[54] BISTABLE FUEL VALVE

[75] Inventors: Clement J. Turansky, Tonawanda; Gerard J. LeBlanc, North Tonawanda, both of N.Y.

[73] Assignee: Textron Inc., Providence, R.I.

[21] Appl. No.: 350,259

[22] Filed: Feb. 19, 1982

Related U.S. Application Data

[62] Division of Ser. No. 966,888, Dec. 6, 1978, Pat. No. 4,343,329.

[51] Int. Cl.$^3$ .............................................. F02K 9/02
[52] U.S. Cl. ...................................... 60/225; 137/595; 137/625.44; 244/3.22
[58] Field of Search ............. 60/225; 137/595, 625.44; 251/137; 244/3.22, 169, 172

[56] References Cited

U.S. PATENT DOCUMENTS 3,215,162 11/1965 Carver ............................ 137/625.44
3,373,769 3/1968 Chaves et al. ...................... 137/595

Primary Examiner—Gerald A. Michalsky
Attorney, Agent, or Firm—Bean, Kauffman & Bean

[57] ABSTRACT

A compact bistable, magnetically operated fuel valve embodies an upper portion comprising a pair of similarly poled and spaced apart permanent magnets defining vertical side walls of an enclosure space which is completed by a pair of pole plates sandwiching the permanent magnets therebetween. The pole plates provide pole faces at their opposite ends and the two sets of pole faces define air gaps. Within the space there is located an armature of plate like form centrally mounted on an upstanding flexure tube. A valve actuating rod is connected at one end to the free end of the flexure tube and projects therethrough downwardly into a valve block. The valve block presents at least one fuel chamber provided with means for supplying pressurized propellant thereto and is provided with oppositely directed fuel outlets to which oppositely directed thrusters are connected. The armature is held in one of two rocked positions in opposition to the centering action of the flexure tube, the free ends of the armature being located in the air gaps. A pair of coils surround the armature and a pulsing mechanism is connected to the coils sequentially to energize them to oppose oppositely directed flux fields therein and allow the armature to snap from one rocked position to the other. The energizing pulses are controlled in relative phase to control the net thrust produced by the oppositely directed thrusters.

4 Claims, 6 Drawing Figures

BI-PROPELLANT

BI-PROPELLANT

MONOPROPELLANT

BISTABLE FUEL VALVE

This is a division of application Ser. No. 966,888, filed Dec. 6, 1978, now U.S. Pat. No. 4,343,329, the benefit of filing date of which is hereby claimed.

BACKGROUND OF THE INVENTION

In a space vehicle, it is often necessary to make attitude corrections thereof about any one or a combination of three mutually orthogonal axes and for this purpose a pair of thrusters for producing relative opposite moments about each of the three axes are utilized. The monopropellant or bipropellant systems for fueling the thrusters is required to be valved thereby to control angular motions about each of the three axes. Such space vehicles are limited in power supply and it is therefore desirable that the power required to operate the various valving means consume as little power as is possible.

BRIEF SUMMARY OF THE INVENTION

The present invention is directed to the solution of the above problem and does so, generally by the provision of a bistable valve assembly which is normally latched in one of two positions under the influence of permanent magnet means so that no extraneous power is required to hold a particular valve condition. The arrangement according to this invention is adapted to feed, sequentially, two opposite directed thrusters so that when propellant flow to one of the thrusters is interrupted, the propellant flow to the other thruster takes place, and vice versa. Because the valve is bistable, and is latched in either one of its two conditions by permanent magnets which do not require external power supply, the arrangement is such that low power, short duration electrical energy pulses are effective to initiate the transition of the valve from one latched condition to the other.

More specifically, the valve is actuated by a rocking armature which is normally latched in one of its two rocked positions by permanent magnet means such that the flux field passing through the armature in one latched condition is of opposite direction with respect to the flux field passing through the armature in the other latched condition. Coils are associated with the armature respectively to oppose these oppositely directed flux fields to allow the armature to be urged by a flexure tube to snap between the two latched positions thereof. The short duration pulses do not consume much energy and if the pulses to the two coils are in phase opposition such that the armature attains the two rocked conditions at regular intervals, the net thrust exerted by the thruster will be zero. However, if the relative phase of the signals to the two coils is varied, the armature will more rapidly snap between a first position and a second position than it will between a second position and a first position, thereby producing a net thrust in one direction of rotation or the other about the associated axis.

The entire assembly may be made very compact and with the mass of the armature and component parts very small so that relatively low energy control pulses are effective to achieve the bistable action.

BRIEF DESCRIPTION OF THE DRAWING FIGURES

DETAILED DESCRIPTION OF THE INVENTION

Figure 1:
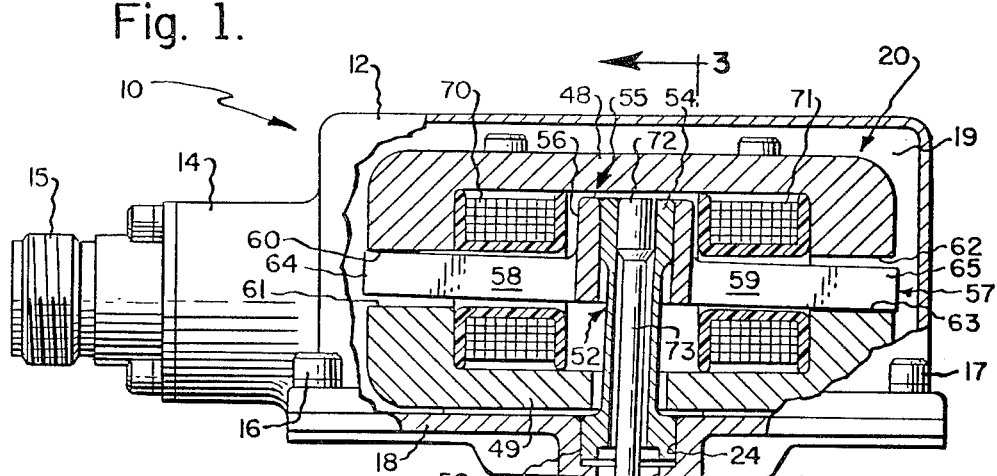
FIG. 1 is a vertical section taken through a fuel valve according to the present invention.

With reference at this time more particularly to FIG. 1, the bistable valve assembly is indicated generally by the reference character 10 and will be seen to include a case 12 having an electrical outlet connection neck 14 at one end provided a threaded coupling 15 by means of which electrical connections for the two coils hereinafter specified may be connected to the assembly.

The case 12 is removably secured as by the fasteners 16, 17 to a base plate 18 which, together with the cover portion 12 forms an enclosure 19 to protect the magnetic section 20 of the bistable valve assembly.

Figure 2:
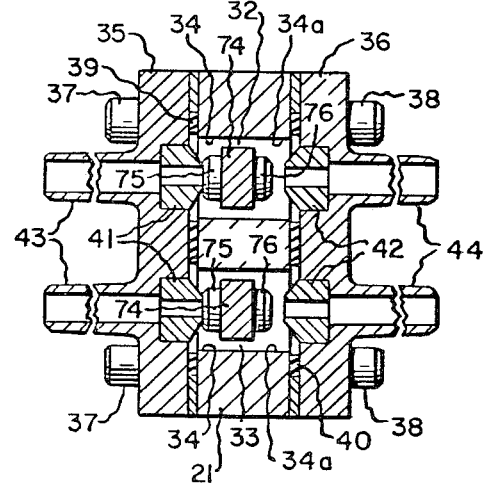
FIG. 2 is a horizontal section through the valve block as indicated generally by the section line 2—2 in FIG. 1.
Figure 3:
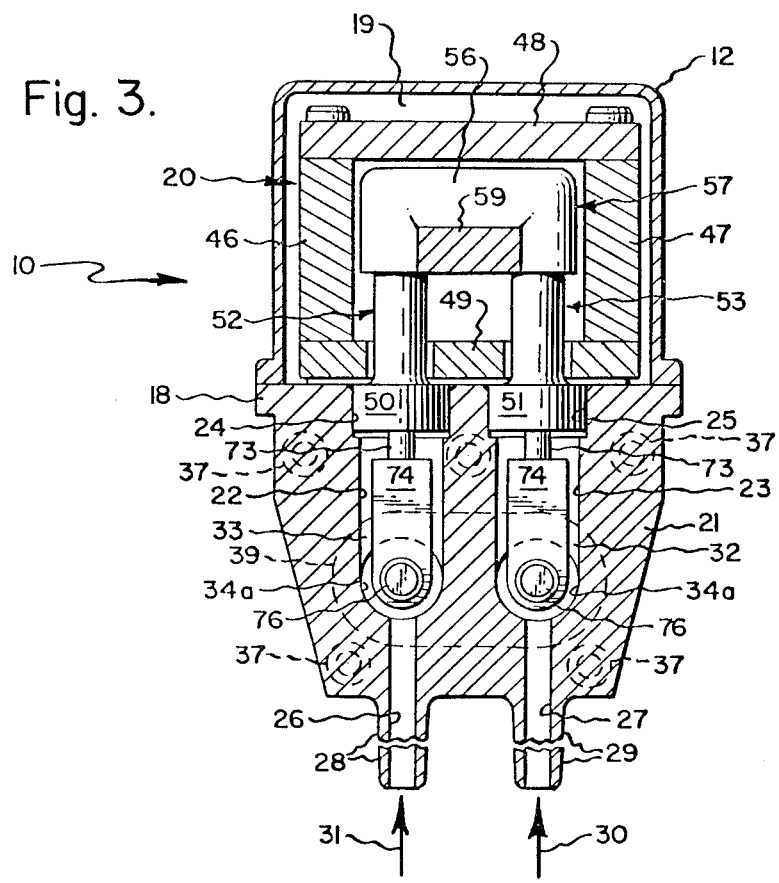
FIG. 3 is a transverse vertical section taken substantially along the plane of section line 3—3 in FIG. 1.

The base plate 18 includes a depending web 21 as is illustrated more clearly in FIG. 3 which, from its upper side, is provided with the two main bores 22 and 23 and their respective counterbores 24 and 25 and, from the lower side, with the two propellant inlet bores 26 and 27. The propellant inlet stubs 28 and 29 are, in this particular embodiment, connected to a supply of fuel under pressure as indicated by the arrow 30 and to an oxidizer fluid under pressure as is indicated by the reference character 31. The web 21 provides a fuel block having the adjacent chambers 32 and 33 and, as is more clearly shown in FIG. 2, each chamber is provided with oppositely directed inlet bores 34 and 34a. To the opposite sides of the web 21 are attached the valve block plates 35 and 36, secured thereto as by the fasteners 37 and 38 and which plates 35 and 36 are suitably sealed with respect to the opposite sides of the web 21 by suitable gaskets 39 and 40. The plates 35 and 36 carry four valve seats, two of which are indicated in FIG. 1 by the reference characters 41 and 42 which are seated in counterbores on the inner faces of the plates in registry with the propellant outlets 43 and 44 which project in relatively opposite directions as is indicated in FIG. 1.

Figure 4:
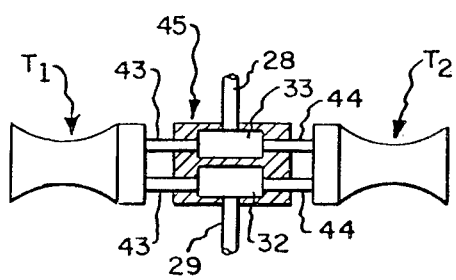
FIG. 4 is a diagrammatic view illustrating the bi-propellant fuel system in accord with this invention.

The valve block assembly is indicated generally by the reference character 45 in FIG. 4 and, as illustrated, the outlets 43 and 44 communicate respectively with the thruster means indicated by the reference characters $T_1$ and $T_2$. When the outlets 13 are connected to the associated thrusters $T_1$ so that fuel may flow, the outlets 44 simultaneously being blocked, the thruster $T_1$ will produce a moment about the associated control axis and, likewise, when the outlets 44 and the outlets 43 blocked, the thruster $T_2$ will produce a moment in the opposite direction. So long as the thrusters are operated sequentially for identical periods of time, the net thrust about the control axis will be zero.

Mounted on the upper side of the base 18 within the enclosure 19 is the previously mentioned actuating assembly 20. This assembly comprises a pair of wall-like permanent magnets 46 and 47 as is shown in FIG. 3 which are disposed in spaced apart relationship and are sandwiched between the pole pieces 48 and 49 so as to define a generally hollow assembly affording a space therewithin. The two counterbores 24 and 25 in the web 21 receive the lower ends 50 and 51 of respective flexure tubes 52 and 53 and are permanently secured therewithin as by brazing or the like. The upper ends 54 of these tubes, see FIG. 1, are received in bores 55 in an upstanding central portion 56 of an armature assembly indicated generally by the reference character 57. The armature is of generally plate-like or elongate configuration and has oppositely extending arms 58 and 59 which project from opposite sides of the central portion 56 as illustrated. The opposite ends of the upper and lower pole plates 48 and 49 are narrowed or necked down and are mutually inwardly turned as shown to present air gaps between the corresponding opposite ends of these two pole pieces between the pairs of pole faces 60,61 and 62,63. The opposite extremities 64 and 65 of the armature are disposed within these air gaps and, as noted previously, the permanent magnets 46 and 47 are similarly poled so that the two pole faces 60 and 62 are, for example, north poles and the two faces 61,63 are south poles. Thus, when the armature is in the position shown in FIG. 1, the extremity 64 is the north end and the extremity 65 is the south end. When the armature is in the opposite rocked condition, the extremity 64 will be the south end and the extremity 65 will be the north end. The flexure tubes 52 and 53 tend to return the armature to a central position within the air gaps but the permanent magnets 46 and 47 are of sufficient strength to retain the armature in one of the two latched positions such as the position shown in FIG. 1.

The coils 70 and 71 are disposed within the space provided by the permanent magnet and pole piece assembly and are disposed in surrounding relationship with respective arms 58 and 59 of the armature and these two coils are similarly wound so that when one of them is energized with a positive going electrical signal, the flux field produced in the position of the armature shown in FIG. 1 will be opposed, whereas the other one is energized with a negative going pulse, the flux field existing in the armature when it is in the other rocked position will be opposed. This prevents ambiguity.

The upper end 72 of a valve actuating rod 73 is anchored and secured within the upper end 54 of the flexure tube and the rod projects completely therethrough and is provided at its lower end with a member 74 having the two valves 75 and 76 thereon, cooperable respectively with the valve seats 41 and 42. The valves 75 and 76 close off their respective outlets 43 or 44, dependent upon the rocked position of the armature.

Figure 6:
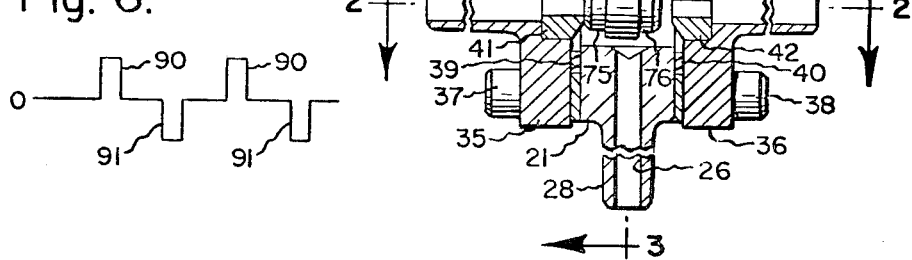
FIG. 6 is a waveform illustrating control signals to the coils.

FIG. 6 shows typical waveforms which are applied to the respective coils 70,71. The positive going pulses 90 are applied to one coil while the negative going pulses 91 are applied to the other coil. In the condition of the control signal as shown in FIG. 6 wherein the positive and negative pulses are 180° out of phase, there will be no net moment exerted by the thrusters. However, by shifting the phase of the two sets of pulses relative to each other, for example, by shifting the pulses 91 to the left in FIG. 6 toward the positive pulses 90, an imbalance occurs so as to produce a net thrust moment in one direction or the other about the control axis. A significant feature of the present invention is the fact that the assemblage may be made so small and compact and with component parts of such light weight that very little power is required to operate the bistable valve. For example, for a 450 psig inlet pressure, the duration of each positive and negative pulse is not required to exceed about 1.7 milliseconds with a typical voltage input of 24 to 32 volts d.c. ±. The frequencies of the positive and negative pulses may be in the order of 100 cps from which it will be apparent that very little power consumption is involved during control command operation. The propellant flow inlets may be fed through a similar bistable arrangement which simply cycles a valve on or off and which, therefore, consumes negligible power indeed since it will have to be cycled on and subsequently off only once during each control command function.

Figure 5:
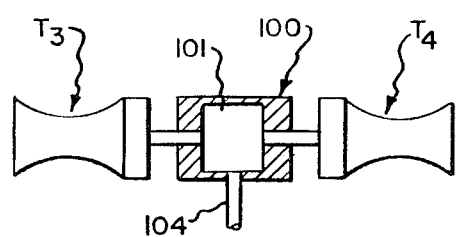
FIG. 5 is a view similar to FIG. 4 but showing a mono-propellant system in accord with this invention.

FIG. 5 illustrates a mono-propellant system constructed in accordance with this invention wherein the valve block 100 contains but a single chamber 101 for controlling the thrusters $T_3$ and $T_4$ and, as will be evident, in this case there is only one flexure tube, control valve and mono-propellant fuel inlet 104. Otherwise, the operation remains the same as described above in connection with the bi-propellant system of FIGS. 1–4.

What is claimed is:

1. A magnetically actuated bistable thruster valve assembly comprising, in combination:

a permanent magnet assembly including a pair of spaced apart, plate-like permanent magnets disposed in similarly poled positions, first and second pole plates sandwiching said permanent magnets therebetween and forming therewith a generally enclosed space, and said pole plates having mutually spaced opposite end portions whereby to define air gaps therebetween;

an armature disposed within said space and having opposite end portions respectively received in said gaps;

flexure means within said space and connected substantially centrally to said armature for allowing said armature to rock between a first position in which one end thereof engages one pole plate while the other end engages the other pole plate to establish a flux field in one direction through the armature and a second position in which said one end thereof engages said one pole plate, said flexure means normally urging said armature to a neutral position between said first and second positions thereof and said permanent magnets having sufficient strength to retain said armature in either of its first and second positions, once attained;

a pair of coils disposed in said space in surrounding relation to said armature for opposing, when sequentially energized, the respective flux field established in said armature by said permanent magnets whereby to allow said armature to be released from its first position and snap toward its second position and vice versa;

pulsing means for periodically and transiently energizing said coils to oppose said flux fields for times sufficient to allow said armature to move from one position to the other;

a valve block mounted below said pole plates and defining a valve chamber, means for delivering propellant under pressure into said chamber, and a pair of oppositely directed propellant outlets communicating with said chamber;

a valve member connected to said armature and projecting downwardly from said space into said chamber, said valve member having two valves thereon for respectively closing off said propellant outlets when said armature is in its first and second positions;

oppositely directed thruster means connected to said respective propellant outlets; and means for varying said pulsing means to control the net thrust produced by said thrusters.

2. A bistable thruster valve as defined in claim 1 wherein said flexure means is in the form of a tube and said valve member comprises a rod secured at one end to a free end of said tube.

3. A bistable thruster valve as defined in claim 2 wherein said flexure tube is fixed at one end to said valve block and projects therefrom into said space, and said rod projecting through said tube into said chamber.

4. A bistable thruster valve as defined in claim 1 wherein said valve block provides separate but adjacent chambers and includes means for introducing bipropellant fluids under pressure into the respective chambers, the second chamber also having oppositely directed outlets communicating with said thruster means, a second valve member connected to said armature and having two valves for respectively closing off the outlets of said second chamber.

* * * * *

UNITED STATES PATENT AND TRADEMARK OFFICE
CERTIFICATE OF CORRECTION

PATENT NO. : 4,428,188
DATED : January 31, 1984
INVENTOR(S) : Clement J. Turansky et al It is certified that error appears in the above—identified patent and that said Letters Patent are hereby corrected as shown below:

Col. 2, Line 58 - "13" should be -- 43 --.

Signed and Sealed this

Twenty-fourth Day of April 1984

[SEAL]

Attest:

GERALD J. MOSSINGHOFF

Attesting Officer

Commissioner of Patents and Trademarks